United States Patent [19]
Falkenberg

[11] 3,945,264
[45] Mar. 23, 1976

[54] REACTION SUPPORT FOR PULLEY HOLDDOWN

[75] Inventor: Douglass R. Falkenberg, Rocky River, Ohio

[73] Assignee: Douglass Manufacturing Company, Inc., Elyria, Ohio

[22] Filed: June 3, 1974

[21] Appl. No.: 475,390

[52] U.S. Cl.................. 74/242.1 A; 74/242.11 A; 74/242.14 R; 267/72
[51] Int. Cl.² .... F16H 7/12; F16H 7/10; F16F 1/00; F16F 9/00
[58] Field of Search .............. 74/242.1 A, 242.11 A, 242.14 R; 267/72, 71

[56] References Cited
UNITED STATES PATENTS

| | | |
|---|---|---|
| 3,112,103 | 11/1963 | Falkenberg ........................... 267/71 |
| 3,123,351 | 3/1964 | Graber ................................... 267/71 |
| 3,151,857 | 10/1964 | Falkenberg .................. 74/242.14 R |

*Primary Examiner*—Leonard H. Gerin
*Attorney, Agent, or Firm*—Alan N. McCartney

[57] ABSTRACT

A reaction type support for a pulley holddown for traverse rods providing a reaction support for the foot of the holddown as a mounting to either a wall or floor surface to take up increase in length of traverse rod cord and permit outward pull of the cord during traverse rod adjustment to prevent damage to or release of the holddown from the support surface.

9 Claims, 9 Drawing Figures

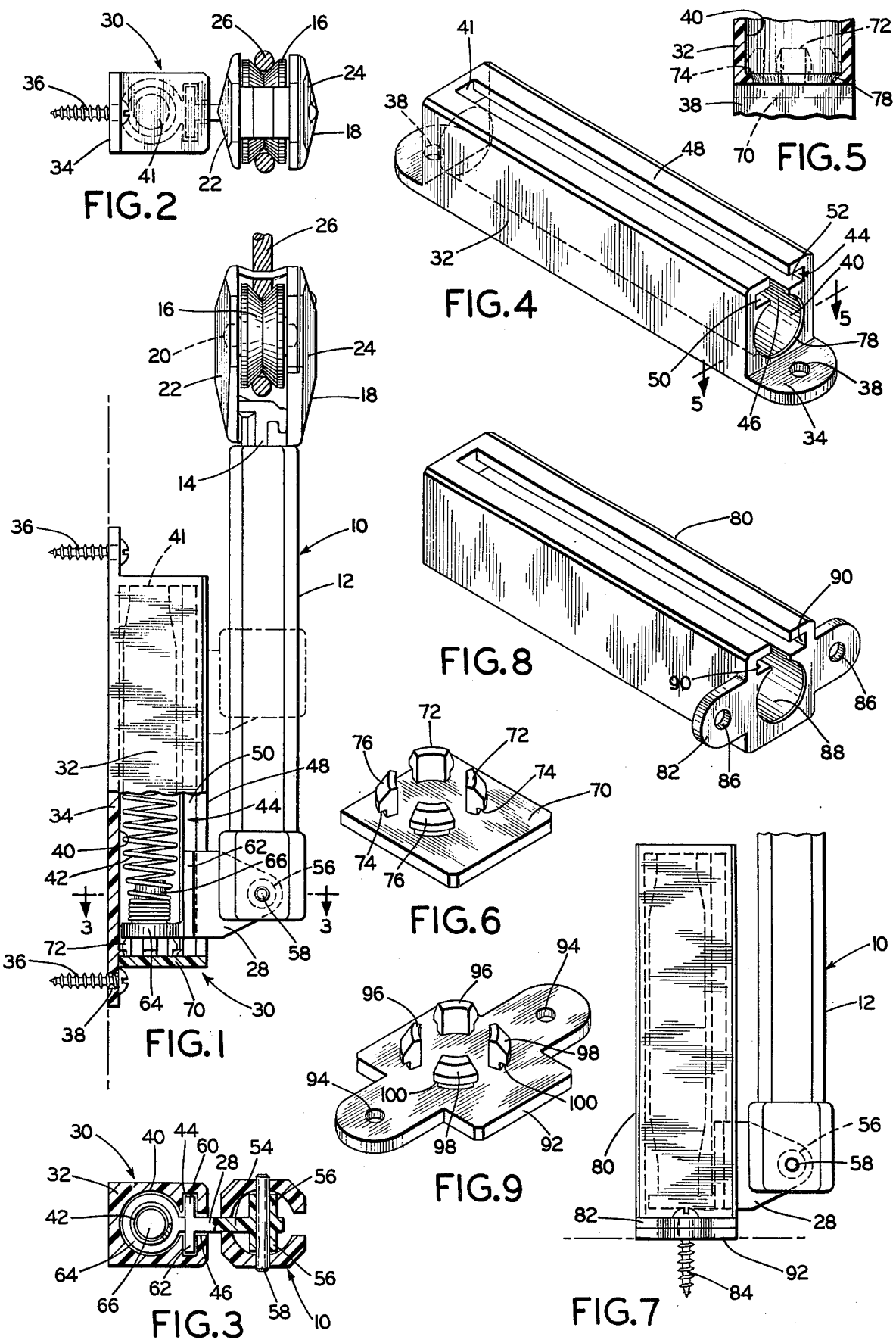

3,945,264

REACTION SUPPORT FOR PULLEY HOLDDOWN

BACKGROUND OF INVENTION

Holddowns for pulleys for the operating cords for traverse rods of adjustable drapes or curtains have been in use for some time. An illustration of such a holddown is shown in U.S. Pat. No. 3,112,103. These holddowns have a main support section adapted to be secured to a wall or molding and a spring-biased pulley arrangement co-operating with the main support to place the drapery cord, which passes about the pulley, under tension to retain the cord in proper operating position, and the drapery or curtain in its proper decorative position. Through continuous use of opening and closing the drapes or curtains by operation of the traverse rods, the cord will become increased in length. The arrangement, as illustrated in U.S. Pat. No. 3,112,103, is designed to not only place the cord under tension, but also to take up any slack in the cord occurring due to cord wear. The cords themselves are normally made out of cotton and braided to normally retain their desired length. Recently, however, due to the lack of materials of adequate quality of length retention, the cords normally used increase in length to a greater extent than they have in the past. Further, the weight and length of drapery material covering a window has increased, placing the cord under greater tension, causing the cord to increase in length beyond that normally compensated for by the conventional holddowns.

Further, in the normal operation of the cord, and thus the traverse rod, the force applied to the cord is a combined up and down movement, in addition to an outward pull on the cord by the operator. This outward pull on the traverse rod cord during its operation places additional force on the pulley holddown and its attachment means to either a wall or floor surface.

SUMMARY OF INVENTION

The object of this invention is to provide a wall or floor mounted support for receiving and supporting the foot of a pulley holddown. The wall or floor mounted support contains a track for receiving the pulley holddown foot and a spring-biasing means acting on the foot, and thus the holddown and traverse rod cord, to compensate for increase in length of the cord and provide a spring reaction to an outward force placed on the cord by the operator.

Further, improvements and innovations in this invention will become apparent upon reading the accompanying specification and drawing, in which:

FIG. 1 illustrates a side elevational view partly in prospective of a combination pulley holddown and a wall mounted reaction support;

FIG. 2 illustrates a top plan view of the device illustrated in FIG. 1;

FIG. 3 is a sectional view taken along the lines 3—3 of FIG. 1;

FIG. 4 is a prospective view of the wall mounted support of FIG. 1;

FIG. 5 is a sectional view taken along the lines 5—5 of FIG. 4 illustrating the mounting cap inserted in the end of the wall mounted support;

FIG. 6 is an enlarged prospective view of the mounting cap illustrated in FIG. 5;

FIG. 7 is a side elevational view of the floor mounted reaction support embodiment;

FIG. 8 is a prospective view of the floor mounted support illustrated in FIG. 7; and, FIG. 9 is an enlarged prospective view of the mounting cap for the floor mounted reaction support illustrated in FIG. 7.

PREFERRED EMBODIMENT

Attention is now directed to FIG. 1 of the drawing, which illustrates a pulley holddown 10 having a fixed body portion 12 retaining a pulley rod 14 carrying a pulley 16. The pulley rod 14 is spring-biased within the body 12 to place the drapery cord 26 retained on the pulley 16 in tension to retain the cord in a proper operative position and to prevent the cord from becoming entangled. The pulley 16 is mounted within a support 18 carried on pulley rod 14 and is mounted on a spindle 20 for free rotation within pulley support 18. The pulley support 18 comprises a side member 22 integral with pulley rod 14 and a removable side portion 24 permitting access to the pulley for insertion of the drapery cord. The details of the holddown 10 thus described are generally of the type described in U.S. Pat. No. 3,112,103.

Pivotally mounted on the lower end of the pulley holddown 10 is a foot 28 which, in accordance with the teaching of U.S. Pat. No. 3,112,103, would be attached to the wall surface. However, in normal operation of the cord and with pulley rod 14 partially or completely extended to take up slack in the cord, an outward pull on the cord would place an undesirable amount of force on the pulley holddown and its attachment to the wall surface. It is, therefore, desirable to provide a spring-biased reaction member between the pulley holddown foot and the mounting to the wall or floor surface. Further, as will become apparent hereinafter, a partial loading of such a spring-biased reaction member can assist in taking up slack in the traverse rod cord occurring through wear.

As illustrated in FIGS. 1 and 7, such a reaction support can be either mounted on a wall surface or a floor surface depending on the location for desirable operation of the pulley holddown. The wall mounted reaction support 30, illustrated in FIG. 1, contains a body portion 32 and a base 34 having openings 38 for receipt of attaching screws 36 to mount the reaction support 30 on the wall surface. The body 32 has a cylindrical opening 40 having a closed end 41 with the opening 40 adapted to receive a spring 42 resting against closed end 41 of the body 32. The reaction support body 32 contains a track 44 along the outer side of the cylindrical opening 40 formed by an opening 46 extending outwardly through the outer face 48 of the body 32. The track 44 also includes opposed side track members 50 and 52 extending into the outer face 48 of the body 32.

The main body 54 of the pulley holddown foot 28 contains a hub 56 extending into the open end of pulley holddown 10, and pivotally supported therein by a cross pin 58 extending through the hub 56 and into the sides of the holddown 10. The opposite side of foot 28 carries outwardly extending guides 60 and 62 which ride in tracks 50 and 52 in the body 32 of reaction support 30, enabling foot 28 to maintain the desired relationship in respect to reaction support 30. Carried on foot 28, adjacent guides 60 and 62, is a cylindrical spring stop 64 adapted to ride in cylindrical opening 40. Spring stop 64 carries extension 66 which rides in the open end of spring 42 permitting the spring to act on spring stop 64. The spring 42, thus being contained between the enclosed end 41 of body 32 and foot 28 through spring stop 64, places a downward force on the foot of the pulley holddown; or in the alternative, acts as a resilient reaction member to upward force on the foot of the pulley holddown, which can be caused by an outward pull on the traverse rod cord 26.

In assembly, after spring 42 is inserted in cylindrical opening 40 of the body 32 and spring stop 64 placed in cylindrical opening 40 with guides 60 and 62 placed in tracks 50 and 52 the open end of the body 32 is closed by a cap 70 illlustrated in FIGS. 5 and 6. The cap 70 has a plurality of molded fingers 72 extending from the face thereof. The fingers 72 contain shoulders 74 and are shaped with a lead 76, as illustrated in FIGS. 5 and 6. The open end of cylindrical opening 40 contains an annular lip 78 molded into the body of the support 30. After assembly of support 30 with the pulley holddown foot 28 and spring 42, cap 70 is placed adjacent the open end of cylindrical opening 40 with the leads 76 on fingers 72 abutting the lip 78 in the body 32. Pressure applied to the cap 70 causes inward movement of resilient fingers 72, which snap-fit into the opening 40 between shoulders 74 resting on lip 78 in the body 32, as illustrated in FIG. 5.

Attention is now directed to the floor mounted embodiment of the reaction support, as illustrated in FIGS. 7, 8, and 9. The floor mounted reaction support 80 has a base 82 containing openings 86 adapted to receive attaching screws 84 for securing support 80 to the floor surface. The support 80 also contains an opening 88 for receipt of a reaction spring and tracks 90 are provided in the body of the support 80 for receipt of guides on the foot of the holddown. In this embodiment, the spring in the support 80 being contained within the body of the support, and acting on the foot 28 in the same fashion as the embodiment illustrated in FIGS. 1 through 6, thus provides a downward force on the foot 28 or a reaction member upward movement of the foot 28 due to an outward pull on the traverse rod cord. A cap 92 is provided to enclose the open end of the opening 88 on the body of the support 80. The cap 92, as illustrated in FIG. 9, contains the same shape and configuration as the base 82 of support 80 with openings 94 in the cap 92 matching openings 86 permitting attachment of the support to the floor surface. In the same fashion as cap 70, the cap 92 contains resilient fingers 96 having leads 98 and shoulders 100 adapted to coact with a lip, similar to lip 78, formed in the open end of the body of support 80. In this fashion, as with respect to cap 72, the cap 92 snap-fits onto the body of the support 80 to retain the pulley holddown and the reaction support in assembled condition.

The respective spring rates of spring 42 and the spring within the body 12 of the pulley holddown 10 are not critical, but the rate of spring 42 must be sufficient to provide a suitable reaction to an outward pull on the cord 26. In addition to providing such a reaction support, as described, the wall mounted support 30 or floor mounted support 80 can also be utilized to assist in taking up slack in the traverse rod cord 26. This can be accomplished by pre-tensioning the spring in the reaction support. During installation of the traverse rod, cord, and pulley holddown, the pulley rod 14 is normally extended fully out of the body 12 of the holddown 10 to compress the spring within the body 12 and place the cord 26 under tension. Additional tension on the cord 26 could also be accomplished by compressing the spring within the reaction support by upward movement of the holddown foot within the support, thus permitting the reaction support to not only function during outward pull on the traverse rod cord, but also assist in taking up slack in the cord normally resulting from cord wear.

I claim:

1. In combinatin with a pulley holddown for retaining the operating cord of a traverse rod which carries drapery material adjacent a window or wall opening, the pulley holddown retaining the operating cord in tension and proper operative position:
   a. A separate reaction support adapted to be attached to a wall or floor surface and cooperating with the pulley holddown to provide a resilient reaction means between the pulley holddown and the wall or floor surface; and,
   b. the reaction support comprising an elongated member having a sliding coacting engagement with the pulley holddown and a resilient member resisting such sliding engagement to provide a reaction means to outward pull of the traverse rod cord and upward movement of the pulley holddown.

2. The combination set forth in claim 1 wherein said reaction support has an opening containing a spring and an adjacent track coacting with the pulley holddown, said spring forming the resilient reaction member for said pulley holddown.

3. The combination of claim 2 wherein said reaction support is closed at one end with said opening extending from the other end of said support to said closed end, said spring being positioned in said opening and abutting said closed end, said pulley holddown having means positioned between said spring and an open end of said support and a cap closure for the open end of said support.

4. The combination of claim 3 wherein said open end of said support has an annular lip with said cap closure having a plurality of resilient fingers adapted to be inserted into said open end and snap-fit onto said annular lip.

5. The combination of claim 1 wherein said resilient support has an enlongated body with a base extending from end to end adapted to be secured to a wall surface.

6. The combination of claim 1 wherein said resilient support has an elongated body with a base at one end thereof adapted to be attached to a floor surface.

7. A combination pulley holddown and reaction support for mounting the pulley holddown to a wall or floor surface to permit upward movement of said pulley holddown in response to an outward force on the holddown operating cord:
   a. a pulley holddown having a fixed body portion carrying an extendable pulley rod and pulley retaining a traverse rod operating cord;
   b. said pulley holddown having a pivotally mounted foot;
   c. a reaction support having an elongated body adapted to slidably receive said pulley holddown foot;
   d. said reaction support having a closed end at the top portion thereof; and,
   e. a resilient means between said closed end and said pulley holddown foot providing a resilient reaction member to upward sliding movement of said pulley holddown foot within said reaction support.

8. The combination of claim 7 wherein said reaction support has an elongated opening containing said resilient means, said pulley holddown foot having means positioned in said elongated opening acted upon by said resilient means to resist sliding movement of said foot within said reaction support.

9. The combination of claim 8 wherein said reaction support has track members adjacent said elongated opening and said foot has guide members riding in said track members to maintain the desired relationship between said pulley holddown and said reaction support.

* * * * *